UNITED STATES PATENT OFFICE.

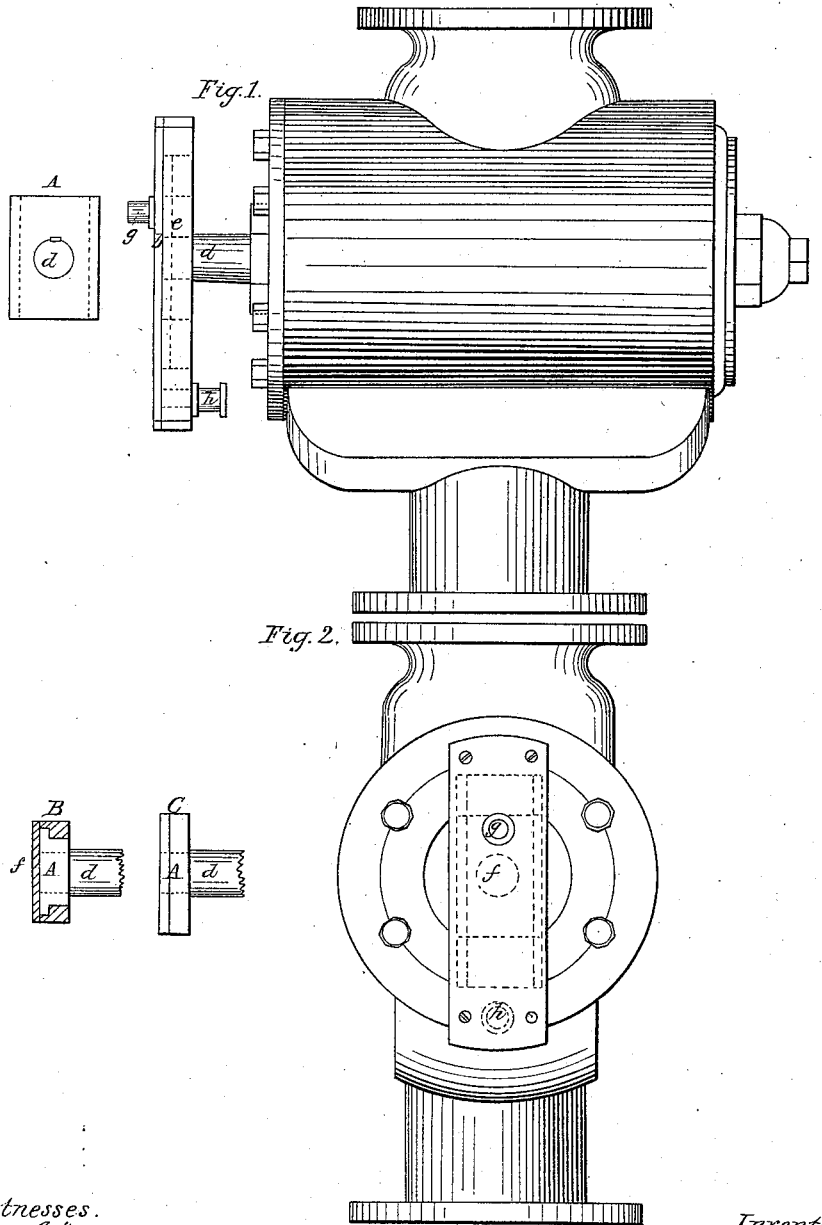

K. H. LOOMIS, OF BALTIMORE, MARYLAND.

IMPROVEMENT IN GOVERNOR CUT-OFF VALVES.

Specification forming part of Letters Patent No. 43,920, dated August 23, 1864.

*To all whom it may concern:*

Be it known that I, K. H. LOOMIS, of the city and county of Baltimore, in the State of Maryland, have invented a new and useful Improvement in Variable Governor Cut-Offs for Steam-Engines; and I do hereby declare that the following is a full, clear, and exact description of the construction and operation of the same, reference being had to the annexed drawings, making a part of this specification, of which—

Figure 1 is a side elevation showing a portion of valve-stem and adjustable arm. Fig. 2 is an end elevation showing head and adjustable arm.

The nature of my improvement relates to and has for its object the providing a vaiiable governor cut-off for steam-engines, for the purpose of regulating the flow of steam to the cylinder and giving equality of motion to the engine.

Fig. 1 represents the ordinary cylinder valve, which may be constructed with more or less openings, so that a small motion of the key of said valve may produce a greater or less steam-passage.

The essential part of my improvement consists in providing an adjustable arm or lever for operating said valve by means hereinafter described.

$a$ is the outer portion of valve-stem. $e$ is a side view of adjustable arm. $h$ is a wrist-pin, by which motion is communicated to said arm. $f$ is the face-plate of the arm. $g$ is the stud to which the governor is attached. A is the block attached to the stem of the valve. $d$ is the end of the valve stem with the face-plate removed. B is a section showing a part of valve-stem, block, arm, and face-plate, as shown in end view. $c$ is a section showing a portion of valve-stem and block, giving a side view.

To enable others skilled in the art to make and use my improvement, I will describe the construction and operation thereof.

The valve which I now use in combination with the improvement of adjustable arm is constructed with an external steam-chamber, surrounding the key of said valve, from which chamber a series of openings, corresponding with openings both in shell and key, allowing the steam to pass from the external chamber to the internal chamber, thereby giving a free passage of the steam to the cylinder when said openings are set in a corresponding position.

I do not confine myself to this particular valve, as the adjustable arm above mentioned may be used advantageously with other valves. Again, I do not confine myself to any particular method of imparting motion to said valve, as this may be accomplished by various devices.

Having given a description of the construction of said valve, I will now more particularly describe what I claim as my improvement in the manner of operating said valve, or its equivalent.

I secure a block on valve-stem, to which is attached a sliding arm or lever, said arm or lever being provided with a slot or opening sufficient to allow said arm or lever to change its position in reference to its fulcrum, being controlled by the governor in reference to length of said arm or lever; also receiving its vibratory motion by means of eccentric, rock-shaft, or otherwise.

I have not considered it necessary to describe any particular method of imparting vibratory motion to said arm, as this may be accomplished by various simple devices without affecting my improvement.

Having described my improvement, what I claim as my invention, and desire to secure by Letters Patent, is—

The employment, in combination, of the block A, secured to stem $d$, arm $e$, wrist-pin $h$, face-plate $f$, and stud $g$, in the manner substantially and for the purpose of regulating the flow of steam to the cylinder of steam-engines as set forth.

In testimony whereof I have hereunto signed my name in the presence of two witnesses.

K. H. LOOMIS.

Witnesses:
JNO. D. LIPSCOMB,
ED. H. WILSON.